US012476388B2

(12) United States Patent
Kasani et al.

(10) Patent No.: US 12,476,388 B2
(45) Date of Patent: Nov. 18, 2025

(54) TWIN-BEAM BASE STATION ANTENNAS HAVING INTEGRATED BEAMFORMING NETWORKS

(71) Applicant: Outdoor Wireless Networks LLC, Claremont, NC (US)

(72) Inventors: Kumara Swamy Kasani, Godavarikhani (IN); Lenin Naragani, Hyderabad (IN); Kamalakar Yeddula, Nandyala (IN); Lakshminarayana Pollayi, Srikakulam (IN); Ligang Wu, Suzhou (CN)

(73) Assignee: OUTDOOR WIRELESS NETWORKS LLC, Richardson, TX (US)

( * ) Notice: Subject to any disclaimer, the term of this patent is extended or adjusted under 35 U.S.C. 154(b) by 337 days.

(21) Appl. No.: 18/040,438

(22) PCT Filed: Mar. 2, 2021

(86) PCT No.: PCT/US2021/020470
§ 371 (c)(1),
(2) Date: Feb. 3, 2023

(87) PCT Pub. No.: WO2022/031326
PCT Pub. Date: Feb. 10, 2022

(65) Prior Publication Data

US 2023/0291123 A1 Sep. 14, 2023

(30) Foreign Application Priority Data

Aug. 7, 2020 (CN) ........................ 202021623662.1

(51) Int. Cl.
*H01Q 21/26* (2006.01)
*H01Q 1/24* (2006.01)
*H01Q 5/42* (2015.01)

(52) U.S. Cl.
CPC ............ *H01Q 21/26* (2013.01); *H01Q 1/246* (2013.01); *H01Q 5/42* (2015.01)

(58) Field of Classification Search
CPC ........... H01Q 21/26; H01Q 1/246; H01Q 5/42
See application file for complete search history.

(56) References Cited

U.S. PATENT DOCUMENTS 5,115,248 A * 5/1992 Roederer ................ H03F 3/602 342/368
2004/0239444 A1 12/2004 Sledkov
(Continued)

FOREIGN PATENT DOCUMENTS

WO 2020/027914 A1 2/2020

OTHER PUBLICATIONS

Notification of Transmittal of the International Search Report and the Written Opinion of the International Searching Authority, or the Declaration, in corresponding PCT Application No. PCT/US2021/020470 (May 19, 2021).

*Primary Examiner* — Graham P Smith
(74) *Attorney, Agent, or Firm* — Myers Bigel, P.A.

(57) ABSTRACT

Base station antennas are provided. A base station antenna includes a reflector having a first surface and a second surface that is opposite the first surface. The antenna includes first and second feed boards having first and second integrated beamforming networks, respectively, on the first surface of the reflector. The antenna includes a first plurality of high-band radiating elements that extend forward from the first feed board. The antenna includes a second plurality of high-band radiating elements that extend forward from the second feed board. Moreover, the antenna includes a plurality of low-band radiating elements on the first surface of the reflector.

13 Claims, 11 Drawing Sheets

(56) References Cited

U.S. PATENT DOCUMENTS

| | | | | |
|---|---|---|---|---|
| 2005/0110683 | A1* | 5/2005 | Song | H01Q 25/005 343/846 |
| 2012/0154224 | A1* | 6/2012 | Kuo | H01Q 1/243 343/702 |
| 2019/0027823 | A1* | 1/2019 | Matitsine | H01Q 3/24 |
| 2020/0411961 | A1* | 12/2020 | Kasani | H01Q 19/108 |
| 2021/0029556 | A1* | 1/2021 | Wu | H01Q 19/106 |

* cited by examiner

TWIN-BEAM BASE STATION ANTENNAS HAVING INTEGRATED BEAMFORMING NETWORKS

CROSS-REFERENCE TO RELATED APPLICATION

The present application is a 35 U.S.C. § 371 national stage application of PCT Application No. PCT/US2021/020470, filed Mar. 2, 2021, which claims priority to Chinese Application for Utility Model No. 202021623662.1, filed Aug. 7, 2020, the entire contents of which are incorporated herein by reference. The above-referenced PCT Application was published in the English language as International Publication No. WO 2022/031326 A1 on Feb. 10, 2022.

FIELD

The present invention generally relates to radio communications and, more particularly, to twin-beam base station antennas used in cellular and other communications systems.

BACKGROUND

Cellular communications systems are well known in the art. In a typical cellular communications system, a geographic area is divided into a series of regions that are referred to as "cells," and each cell is served by a base station. The base station may include baseband equipment, radios, and base station antennas that are configured to provide two-way radio frequency ("RF") communications with subscribers that are positioned throughout the cell. In many cases, the cell may be divided into a plurality of "sectors," and separate base station antennas provide coverage to each of the sectors. The base station antennas are often mounted on a tower or other raised structure, with the radiation beam ("antenna beam") that is generated by each antenna directed outwardly to serve a respective sector. Typically, a base station antenna includes one or more phase-controlled arrays of radiating elements, with the radiating elements arranged in one or more vertical columns when the antenna is mounted for use. Herein, "vertical" refers to a direction that is perpendicular relative to the plane defined by the horizon.

A common base station configuration is a "three sector" configuration in which the cell is divided into three 120° sectors in the azimuth plane, and the base station includes three base station antennas that provide coverage to the three respective sectors. The azimuth plane refers to a horizontal plane that bisects the base station antenna and is parallel to the plane defined by the horizon. In a three sector configuration, the antenna beams generated by each base station antenna typically have a half power beam width ("HPBW") in the azimuth plane of about 65° so that the antenna beams provide good coverage throughout a 120° sector. Typically, each base station antenna will include a vertically-extending column of radiating elements that together generate an antenna beam. Each radiating element in the column may have a HPBW of approximately 65° so that the antenna beam generated by the column of radiating elements will provide coverage to a 120° sector in the azimuth plane. The base station antenna may include multiple columns of radiating elements that operate in the same or different frequency bands.

Most modern base station antennas also include remotely controlled phase shifter/power divider circuits along the RF transmission paths through the antenna that allow a phase taper to be applied to the sub-components of an RF signal that are supplied to the radiating element in an array. By adjusting the amount of phase taper applied, the resulting antenna beams may be electrically downtilted to a desired degree in the vertical or "elevation" plane. This technique may be used to adjust how far an antenna beam extends outwardly from an antenna, and hence can be used to adjust the coverage area of the base station antenna.

Sector-splitting refers to a technique where the coverage area for a base station is divided into more than three sectors in the azimuth plane, such as six, nine, or even twelve sectors. A six-sector base station will have six 60° sectors in the azimuth plane. Splitting each 120° sector into two sub-sectors increases system capacity because each antenna beam provides coverage to a smaller area, and therefore can provide higher antenna gain and/or allow for frequency reuse within a 120° sector. In six-sector sector-splitting applications, a single twin-beam antenna is typically used for each 120° sector. The twin-beam antenna generates two separate antenna beams that each have a reduced size in the azimuth plane and that each point in different directions in the azimuth plane, thereby splitting the sector into two smaller sub-sectors. The antenna beams generated by a twin-beam antenna used in a six-sector configuration preferably have azimuth HPBW values of, for example, between about 27°-39°, and the pointing directions for the first and second sector-splitting antenna beams in the azimuth plane are typically at about −27° and about 27°, respectively.

Several approaches have been used to implement twin-beam antennas that provide coverage to respective first and second sub-sectors of a 120° sector in the azimuth plane. In a first approach, first and second columns of radiating elements are mounted on the two major interior faces of a V-shaped reflector. The angle defined by the interior surface of the "V" shaped reflector may be about 54° so that the two columns of radiating elements are mechanically positioned or "steered" to point at azimuth angles of about −27° and 27°, respectively (i.e., toward the middle of the respective sub-sectors). Since the azimuth HPBW of typical radiating elements is usually appropriate for covering a full 120° sector, an RF lens is mounted in front of the two columns of radiating elements that narrows the azimuth HPBW of each antenna beam by a suitable amount for providing coverage to a 60° sub-sector. Unfortunately, however, the use of RF lenses may increase the size, weight, and cost of the base station antenna, and the amount that the RF lens narrows the beamwidth is a function of frequency, making it difficult to obtain suitable coverage when wideband radiating elements are used that operate over a wide frequency range (e.g., radiating elements that operate over the full 1.7-2.7 gigahertz ("GHz") cellular frequency range).

In a second approach, two or more columns of radiating elements (typically 2-4 columns) are mounted on a flat reflector so that each column points toward the boresight pointing direction for the antenna (i.e., the azimuth boresight pointing direction of a base station antenna refers to a horizontal axis extending from the base station antenna to the center, in the azimuth plane, of the sector served by the base station antenna). Two RF ports (per polarization) are coupled to all of the columns of radiating elements through a beamforming network such as a Butler Matrix. The beamforming network generates two separate antenna beams (per polarization) based on the RF signals input at the two RF ports, and the antenna beams are electrically steered off the boresight pointing direction of the antenna at azimuth angles of about −27° and 27° to provide coverage to the two sub-sectors. With such beamforming network based twin-beam antennas, the pointing angle in the azimuth plane of each antenna beam and the HPBW of each antenna beam may vary as a function of the frequency of the RF signals input at the two RF ports. In particular, the azimuth pointing direction of the antenna beams (i.e., the azimuth angle where peak gain occurs) tends to move toward the boresight pointing direction of the antenna and the azimuth HPBW tends to get smaller with increasing frequency. This can lead to a large variation as a function of frequency in the power level of the antenna beam at the outside edges of the sub-sectors, which is undesirable.

In a third approach, a multi-column array of radiating elements (typically three columns per array) is mounted on each exterior panel of a V-shaped reflector to provide a sector-splitting twin-beam antenna. The antenna beams generated by each multi-column array may vary less as a function of frequency as compared to the lensed and beamforming based twin beam antennas discussed above. Unfortunately, such sector-splitting antennas may require a large number of radiating elements, which increases the cost and weight of the antenna. Additionally, the inclusion of six columns of radiating elements may increase the required width for the antenna and the V-shaped reflector may increase the depth of the antenna, both of which may be undesirable.

Generally speaking, cellular operators desire twin-beam antennas that have azimuth HPBW values of anywhere between 30°-38°, so long as the azimuth HPBW does not vary significantly (e.g., more than 12°) across the operating frequency band. Likewise, the azimuth pointing angle of the antenna beam peak may vary anywhere between +/−26° to +/−33°, so long as the azimuth pointing angle does not vary significantly (e.g., more than 4°) across the operating frequency band. The peak azimuth sidelobe levels should be at least 15 decibels ("dB") below the peak gain value.

SUMMARY

Pursuant to embodiments of the present invention, a twin-beam base station antenna is provided that may include a reflector having a first surface and a second surface that is opposite the first surface. The antenna may include first and second feed boards having first and second integrated beamforming networks, respectively, on the first surface of the reflector. The antenna may include a first plurality of high-band radiating elements that extend forward from the first feed board. The antenna may include a second plurality of high-band radiating elements that extend forward from the second feed board. Moreover, the antenna may include a plurality of low-band radiating elements on the first surface of the reflector.

In some embodiments, the second surface of the reflector may be free of any beamforming network thereon. Moreover, the first feed board and the first plurality of high-band radiating elements may be free of any cables coupled therebetween, and the second feed board and the second plurality of high-band radiating elements may be free of any cables coupled therebetween.

According to some embodiments, the first and second integrated beamforming networks may include first and second integrated Butler Matrixes, respectively.

A base station antenna, pursuant to embodiments of the present invention, may include a reflector having a first surface and a second surface that is opposite the first surface. The antenna may include first and second feed boards having first and second integrated beamforming networks, respectively, on the first surface of the reflector. The antenna may include a first plurality of high-band radiating elements that extend forward from the first feed board. The antenna may include a second plurality of high-band radiating elements that extend forward from the second feed board. The antenna may include a first low-band radiating element on the first feed board. Moreover, the antenna may include a second low-band radiating element on the second feed board.

In some embodiments, the antenna may include a third low-band radiating element on the first feed board, and a fourth low-band radiating element on the second feed board.

A base station antenna, pursuant to embodiments of the present invention, may include a reflector having a first surface and a second surface that is opposite the first surface. The antenna may include a first group having a first plurality of high-band radiating elements on the first surface of the reflector. The antenna may include a second group having a second plurality of high-band radiating elements on the first surface of the reflector. The antenna may include a plurality of low-band radiating elements on the first surface of the reflector. Moreover, the antenna may include first and second feed boards including first and second integrated beamforming networks, respectively, that are coupled to the first and second groups, respectively, without any cables therebetween.

In some embodiments, the first and second feed boards may be on the first surface of the reflector. Moreover, the first and second pluralities of high-band radiating elements may extend forward from the first and second feed boards, respectively.

According to some embodiments, the antenna may include third through tenth feed boards having third through tenth integrated beamforming networks, respectively, on the first surface of the reflector. The antenna may include third through tenth groups of high-band radiating elements on the third through tenth feed boards, respectively. Moreover, the third through tenth groups are coupled to the third through tenth integrated beamforming networks, respectively, and each of the first through tenth groups may include rows of three or four radiating elements.

In some embodiments, the first and second feed boards may be on the second surface of the reflector. Moreover, the antenna may include first and second shorting connectors that couple the first and second feed boards to the first and second groups, respectively.

DETAILED DESCRIPTION

Pursuant to embodiments of the present invention, improved twin-beam base station antennas are provided that overcome or mitigate various of the difficulties with conventional twin-beam antennas. The twin-beam antennas according to embodiments of the present invention may include integrated beamforming networks. As used herein, the term "integrated" refers to elements, such as conductive paths for RF signals, that are part of the same feed board on which radiating elements coupled to the RF signals are mounted. For example, an integrated beamforming network may comprise traces of the same printed circuit board ("PCB") from which radiating elements that are coupled to the traces protrude. The twin-beam base station antennas according to embodiments of the present invention may reduce antenna cost and weight, and improve antenna performance, by using fewer (i) cables, (ii) plastic clips that hold cables, (iii) metal plates, (iv) studs/rivets, and (v) soldering joints and transitions. Such reductions can also decrease antenna assembly time.

Before discussing the twin-beam base station antennas according to embodiments of the present invention, it is helpful to examine a variety of potential twin-beam antenna designs.

Most conventional single-beam base station antennas include one or more vertically-oriented columns of dual-polarized radiating elements. Each dual-polarized radiating element in one of these arrays includes a first polarization radiator and a second polarization radiator. The most commonly used dual-polarized radiating elements are cross-dipole radiating elements that include a slant −45° dipole radiator and a slant +45° degree dipole radiator. The slant −45° dipole radiator of each cross-dipole radiating element in a column is coupled to a first (−45°) RF port, and the +45° dipole radiator of each cross-dipole radiating element in the column is coupled to a second (+45°) RF port. Such a column of cross-dipole radiating elements will generate a first −45° polarization antenna beam in response to RF signals input at the first RF port, and will generate a second +45" polarization antenna beam in response to RF signals input at the second RF port. It will be appreciated, however, that any appropriate radiating elements may be used, including, for example, single polarization dipole radiating elements or patch radiating elements, in other embodiments.

As noted above, most radiating elements are designed to have an HPBW of about 65°. Consequently, a column of conventional cross-dipole radiating elements will generate antenna beams having an azimuth HPBW of about 65°, which is about twice as wide as is appropriate for a twin beam antenna.

Figure 1A:
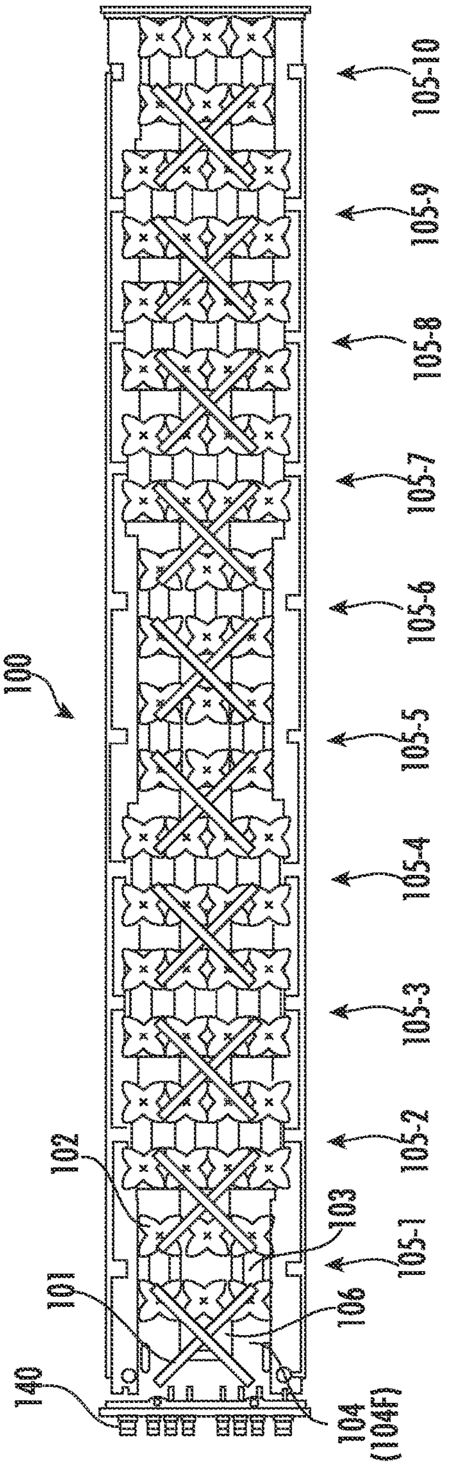
FIG. 1A PRIOR ART
FIG. 1A is a schematic front view of a conventional twin-beam base station antenna.

Referring to FIG. 1A, which is a schematic front view of a conventional twin-beam base station antenna 100, the antenna 100 may include low-band radiating elements 101 and various groups 105, such as arrays or sub-arrays, of high-band radiating elements 102. For example, each group 105 may include two horizontal rows, and three or four vertical columns, of radiating elements 102. Accordingly, each row may include three or four radiating elements 102. As an example, a first group 105-1 may include two rows of three radiating elements 102, and a second group 105-2 may include two rows of four radiating elements 102.

Third through tenth groups 105-3 through 105-10 may similarly include two rows of three or four radiating elements 102. Moreover, the antenna 100 may include ten radiating elements 101. Each radiating element 101 and each group 105 may be on a front surface 104F of a reflector 104 of the antenna 100. In particular, a pair of vertically-adjacent radiating elements 101 may share a feed board 106 that is on the front surface 104F of the reflector 104, and a pair of vertically-adjacent radiating elements 102 may share a feed board 103 that is on the front surface 104F of the reflector 104. Accordingly, each group 105 may include three or four feed boards 103.

The antenna 100 also includes RF ports 140 that are coupled to the groups 105 through beamforming networks 150 (FIG. 1B) such as Butler Matrixes or other beamforming circuitry. Example arrays and beamforming networks coupled thereto are discussed in International Publication No. WO 2020/027914 to Martin L. Zimmerman ("Zimmerman publication"), the disclosure of which is hereby incorporated herein by reference in its entirety.

Figure 1B:
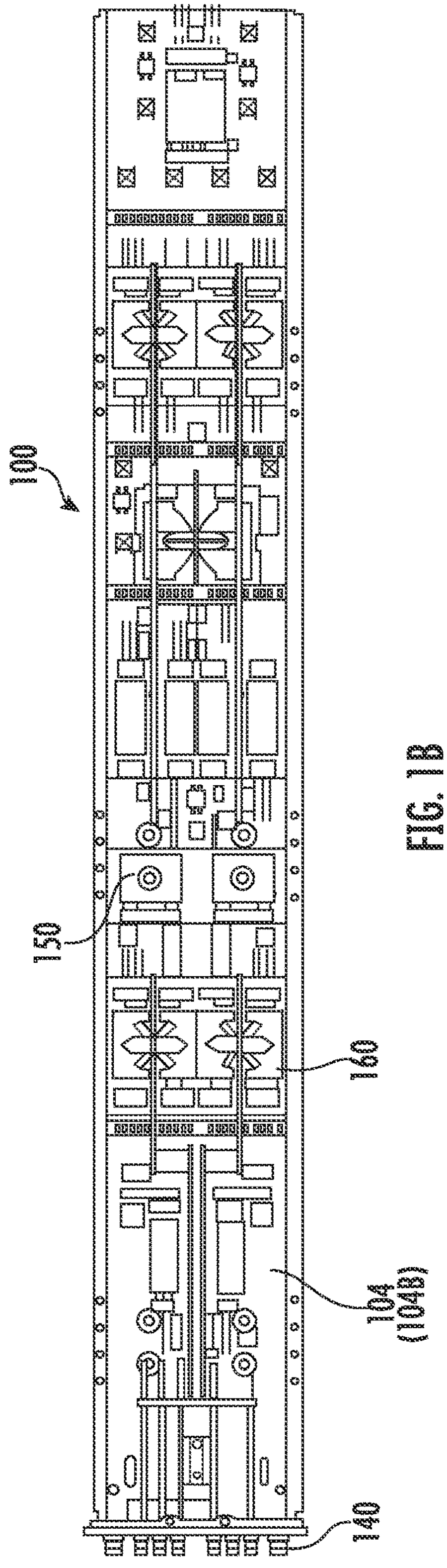
FIG. 1B PRIOR ART
FIG. 1B is a schematic rear view of the base station antenna of FIG. 1A.

FIG. 1B is a schematic rear view of the antenna 100. Specifically, FIG. 1B illustrates a back (i.e., rear) surface 104B of the reflector 104 that is opposite the front surface 104F (FIG. 1A). In addition to beamforming networks 150, the back surface 104B may have phase shifters/power dividers 160 thereon. Example phase shifters/power dividers are discussed in the Zimmerman publication.

Figure 1C:
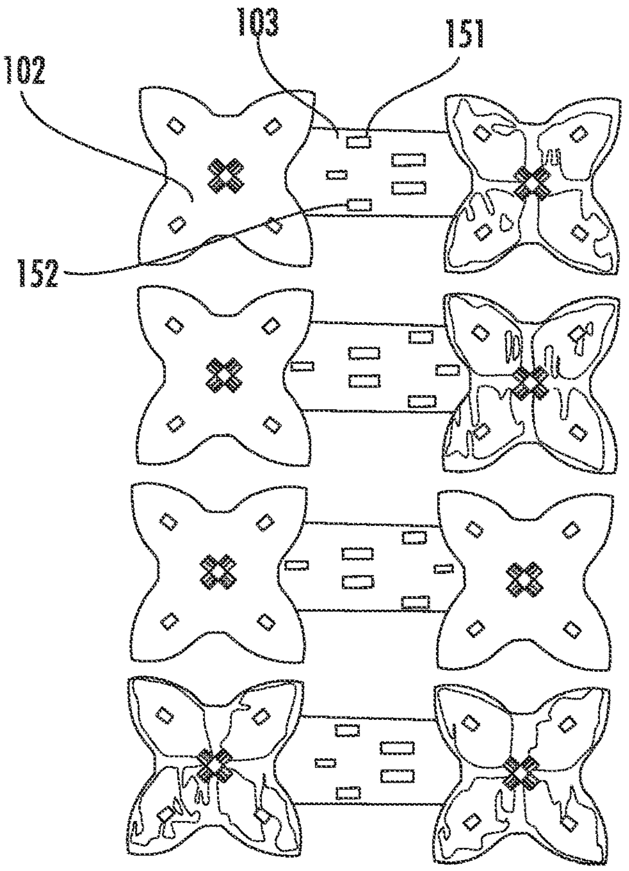
FIG. 1C PRIOR ART
FIG. 1C is an enlarged front view of feed boards of FIG. 1A.

FIG. 1C is an enlarged front view of feed boards 103 of the antenna 100 (FIG. 1A). A respective pair of radiating elements 102 may be mounted on and electrically connected to each of the feed boards 103. In some embodiments, each radiating element 102 may have dipole arms. For simplicity of illustration, however, the radiating elements 102 may be shown schematically without illustrating detail for each dipole arm. Moreover, each radiating element 102 shown in FIG. 1C may be in the same group 105 (FIG. 1A), such as the group 105-2 (FIG. 1A). The group 105 may be coupled to a beamforming network 150 (FIG. 1B) via connection regions 151, 152 that are on the feed boards 103. For example, cables may connect the beamforming network 150 to the connection regions 151, 152 of the feed boards 103.

Figure 1D:
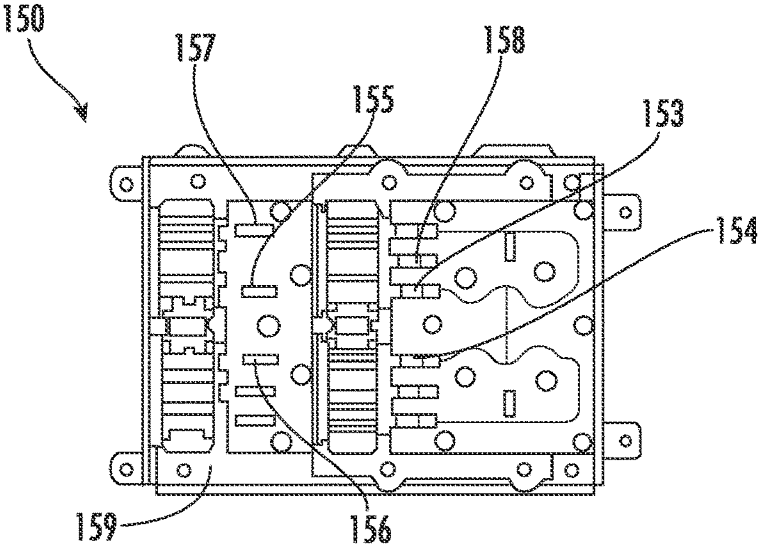
FIG. 1D PRIOR ART
FIG. 1D is an enlarged front view of a beamforming network of FIG. 1B.

FIG. 1D is an enlarged front view of a beamforming network 150. As shown in FIG. 1D, the beamforming network 150 may include connection regions 153, 154 that are coupled to ports 140 (FIG. 1A) of the antenna 100 (FIG. 1A), as well as connection regions 155-158 that are coupled to connection regions 151, 152 (FIG. 1C) of feed boards 103 (FIG. 1C) of the antenna 100. As an example, first cables may be coupled between the connection regions 153, 154 and the ports 140, and second cables may be coupled between the connection regions 155-158 and the connection regions 151, 152 of the feed boards 103. In some embodiments, the connection regions 153-158 may include cable clips and PCBs. Moreover, the beamforming network 150 may include metal plates 159 that support the connection regions 153-158. For example, the connection regions 153, 154 may, in some embodiments, be on a different metal plate 159 from the connection regions 155-158.

Figure 1E:
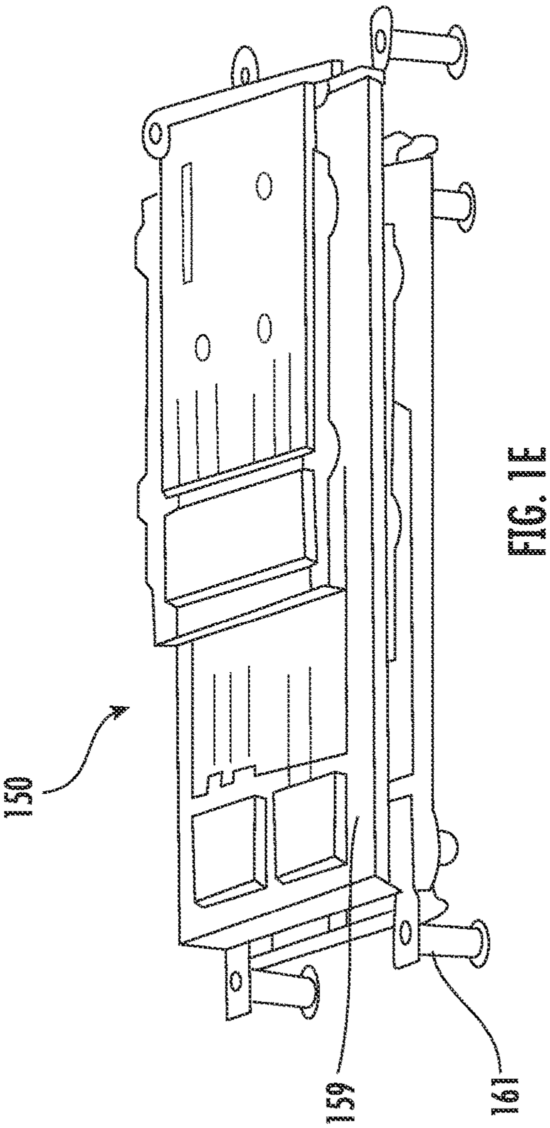
FIG. 1E PRIOR ART
FIG. 1E is a side perspective view of the beamforming network of FIG. 1D.

FIG. 1E is a side perspective view of the beamforming network 150 that is shown in FIG. 1D. As illustrated in FIG. 1E, the beamforming network 150 may include studs/rivets 161 that mount the metal plates 159 on each other and/or on the back surface 104B (FIG. 1B) of the reflector 104 (FIG. 1B). The studs/rivets 161 may be, for example, metal mounting components.

Figure 1F:
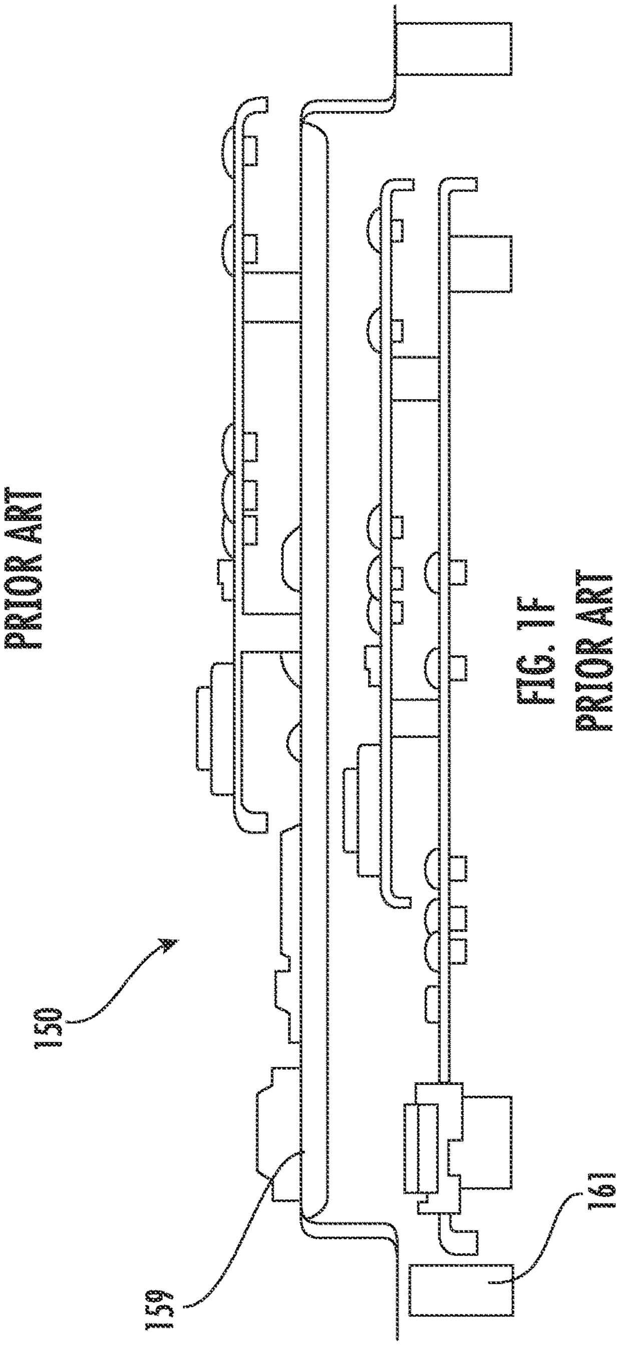
FIG. 1F PRIOR ART
FIG. 1F is a side view of the beamforming network of FIG. 1D.

FIG. 1F is a side view of the beamforming network 150 that is shown FIG. 1D. As illustrated in FIG. 1F, the beamforming network 150 may include a stack of four metal plates 159. In some embodiments, however, the beamforming network 150 include fewer (e.g., three) metal plates 159, such as when the beamforming network 150 is coupled to a group 105 (FIG. 1A) that includes three radiating elements 102 (FIG. 1A) per row rather than four radiating elements 102 per row.

Figure 2A:
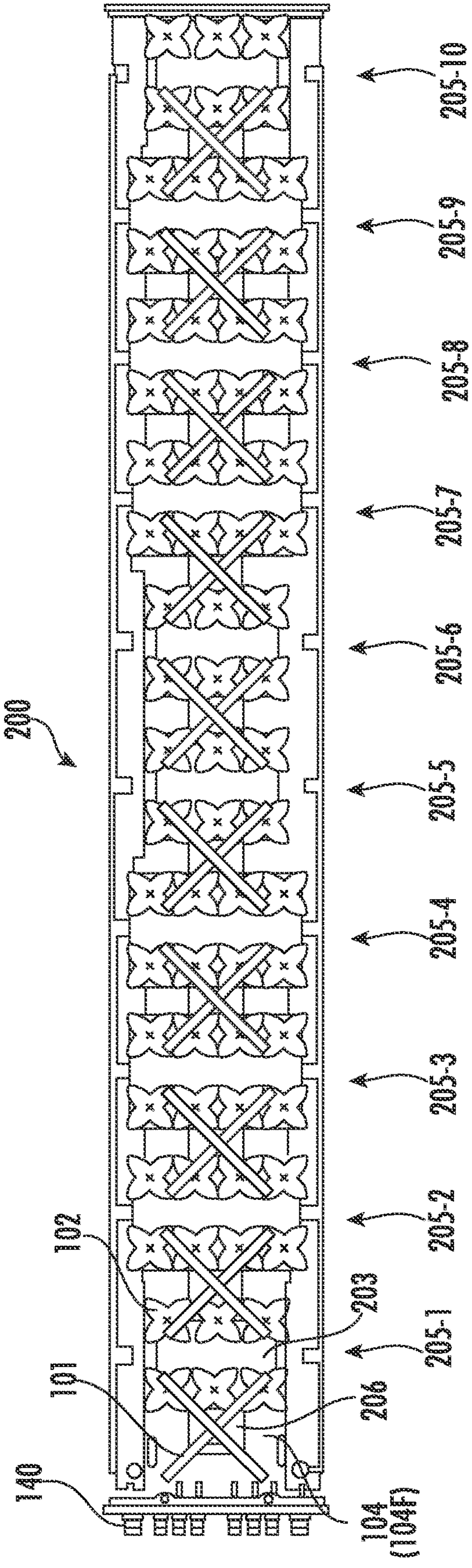
FIG. 2A is a schematic front view of a twin-beam base station antenna according to embodiments of the present invention.

FIG. 2A is a schematic front view of a twin-beam base station antenna 200 according to embodiments of the present invention. Unlike groups 105 (FIG. 1A) of the conventional antenna 100 (FIG. 1A), the antenna 200 has groups 205 that extend forward (e.g., in a direction away from and perpendicular to the front surface 104F of the reflector 104) from respective feed boards 203. For example, instead of using three feed boards 103 (FIG. 1A), a first group 205-1 having three vertical columns of high-band radiating elements 102 may use only one feed board 203. Similarly, instead of using four feed boards 103 (FIG. 1A), a second group 205-2 having four vertical columns of radiating elements 102 may use only one feed board 203. Third through tenth groups 205-3 through 205-10 may likewise use only one respective feed board 203. All radiating elements 102 of a group 205 may thus share the same feed board 203.

Moreover, the shared feed boards 203 may include respective integrated beamforming networks. For example, each feed board 203 may include RF transmission paths 213, 223 (FIG. 2D) that couple a group 205 to RF ports 140 of the antenna 200. In some embodiments, the feed boards 203 may each be in the same plane (e.g., may have respective upper surfaces that are coplanar with each other).

The antenna 200 may also include feed boards 206 from which respective low-band radiating elements 101 extend forwardly. Unlike feed boards 106 (FIG. 1A), which each have a pair of radiating elements 101 thereon, only one radiating element 101 may be on each feed board 206.

Figure 2B:
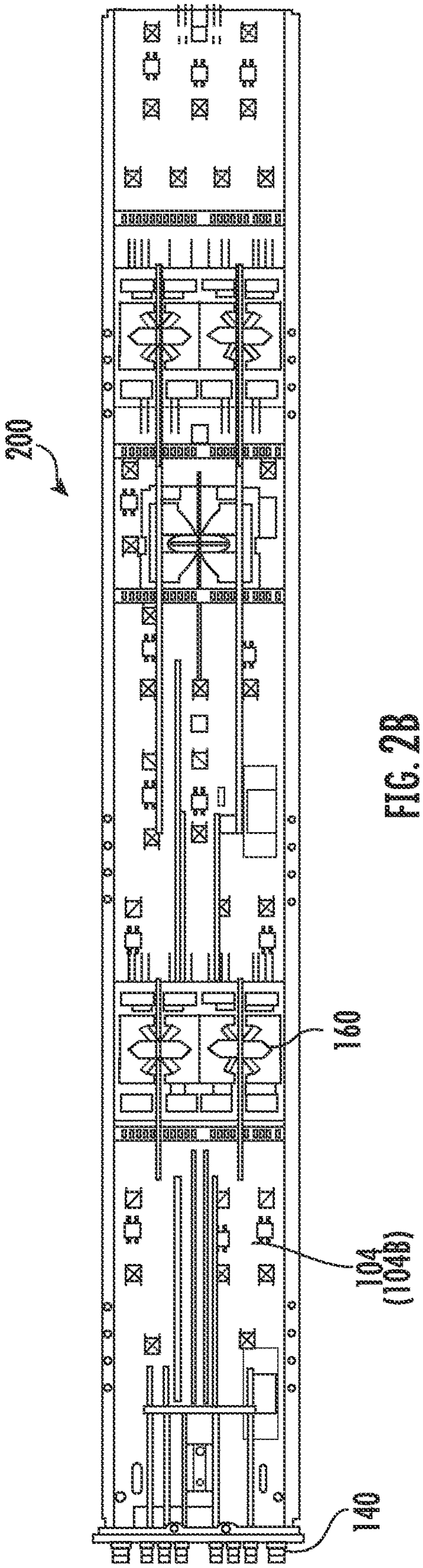
FIG. 2B is a schematic rear view of the base station antenna of FIG. 2A.

FIG. 2B is a schematic rear view of the base station antenna 200. Unlike a back surface 104B of a reflector 104 of the conventional antenna 100 (FIG. 1B), a back surface 104B of a reflector 104 of the antenna 200 may be free of any beamforming network 150 (FIG. 1B) thereon. Instead, each feed board 203 (FIG. 2A), which is on a front surface 104F (FIG. 2A) of the reflector 104 that is opposite the back surface 104B, may include a respective integrated beamforming network. By replacing the beamforming networks 150 of the conventional antenna 100 with integrated beamforming networks, the antenna 200 can use fewer (i) cables, (ii) plastic clips that hold cables, (iii) metal plates 159 (FIG. 1D), (iv) studs/rivets 161 (FIG. 1E), and (v) soldering joints and transitions. For example, each feed board 203 and the radiating elements 102 thereon may be free of any cables coupled therebetween. As a result, the antenna 200 may have a lower cost and weight, as well as a shorter assembly time and improved performance, relative to the conventional antenna 100.

In some embodiments, the back surface 104B of the reflector 104 of the antenna 200 may, like the conventional antenna 100, include phase shifters/power dividers 160 thereon. The phase shifters/power dividers 160 may comprise circuits along RF transmission paths through the antenna 200 that allow a phase taper to be applied to sub-components of an RF signal that are supplied to a radiating element 102 in a group 2055.

Figure 2C:
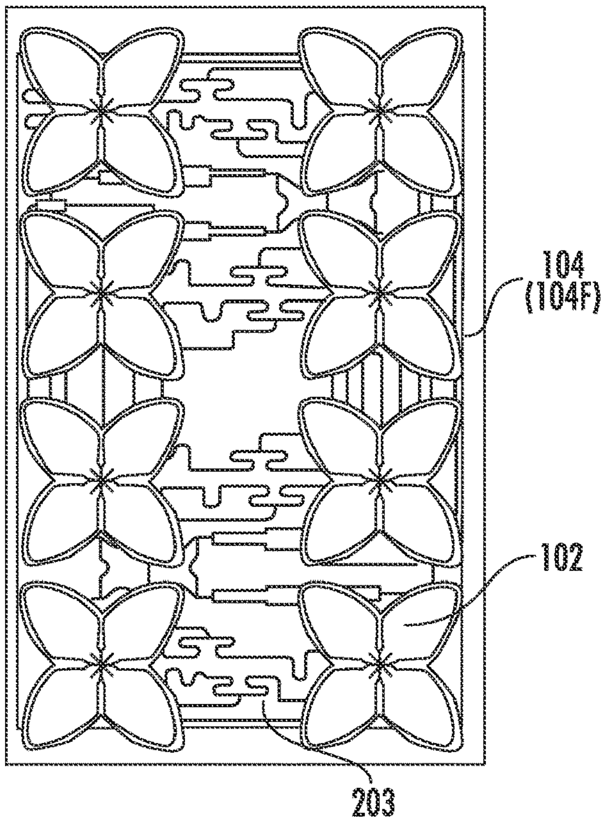
FIG. 2C is an enlarged front view of a feed board of FIG. 2A having eight high-band radiating elements thereon and an integrated beamforming network.

FIG. 2C is an enlarged front view of a feed board 203 having eight high-band radiating elements 102 thereon and an integrated beamforming network. For example, the radiating elements 102 that are shown in FIG. 2C may provide the second group 205-2 that is illustrated in FIG. 2A. Low-band radiating elements 101 (FIG. 2A), which may overlap the second group 205-2, are omitted from view in FIG. 2C for simplicity of illustration.

Figure 2D:
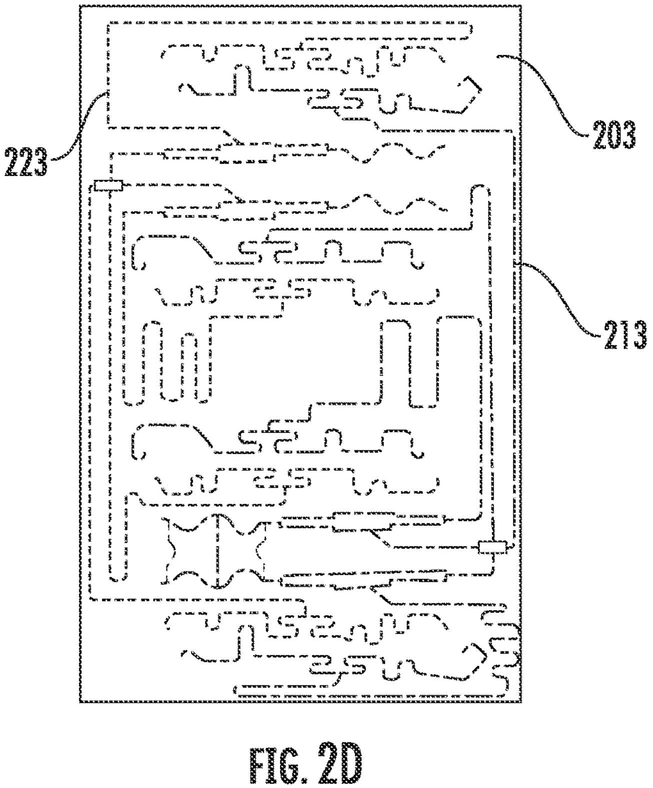
FIG. 2D is a front view of the feed board of FIG. 2C with the radiating elements omitted from view.

FIG. 2D is a front view of the feed board 203 that is shown in FIG. 2C with the eight radiating elements 102 (FIG. 2C) omitted from view for simplicity of illustration. The integrated beamforming network of the feed board 203 includes RF transmission paths 213, 223 that are on the feed board 203. The RF transmission paths 213, 223 are coupled between the radiating elements 102 and ports 140 (FIG. 2A) of the antenna 200. For example, the feed board 203 may comprise a PCB, and the RF transmission paths 213, 223 may comprise conductive traces of the PCB (e.g., copper traces of a front/top side of the PCB) that form transmission lines and other RF circuit elements. Moreover, in some embodiments, the integrated beamforming network may comprise a Butler Matrix. Accordingly, the RF transmission paths 213, 223 may include hybrid couplers, phase shifters, and other elements of conventional Butler Matrix designs.

In some embodiments, rather than integrating the beamforming network onto the feed board 203, it may be integrated onto a smaller, multilayer PCB. For example, such a PCB may include 3 or 4 layers, and may include high dielectric constant dielectric layers that allow the lengths and widths of the RF transmission lines and other components of the beamforming network to be reduced in size.

Figure 2E:
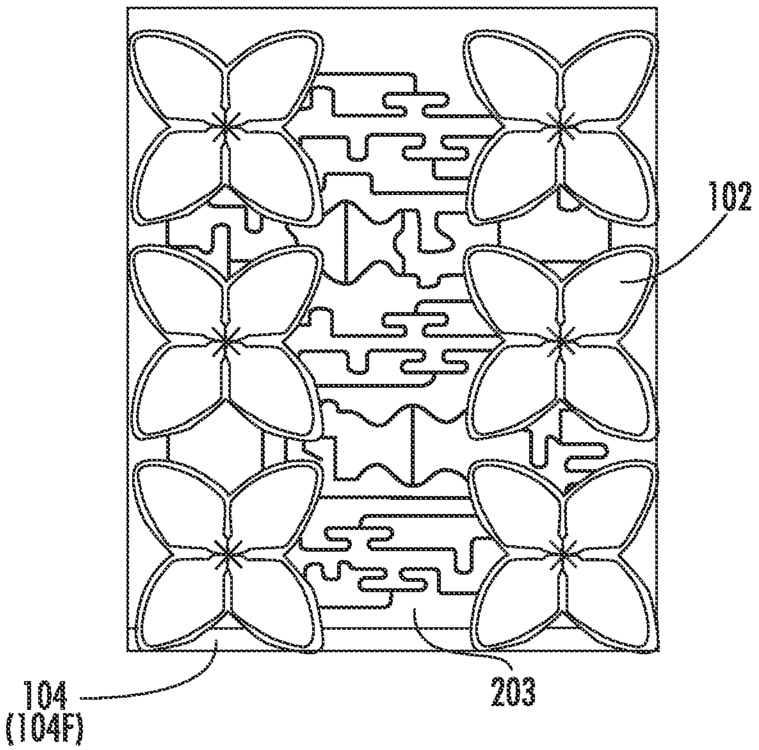
FIG. 2E is an enlarged front view of a feed board of FIG. 2A having six high-band radiating elements thereon and an integrated beamforming network.

FIG. 2E is an enlarged front view of a feed board 203 having six high-band radiating elements 102 thereon and an integrated beamforming network. For example, the radiating elements 102 that are shown in FIG. 2E may provide the first group 205-1 that is illustrated in FIG. 2A. Low-band radiating elements 101 (FIG. 2A), which may overlap the first group 205-1, are omitted from view in FIG. 2E.

Figure 2F:
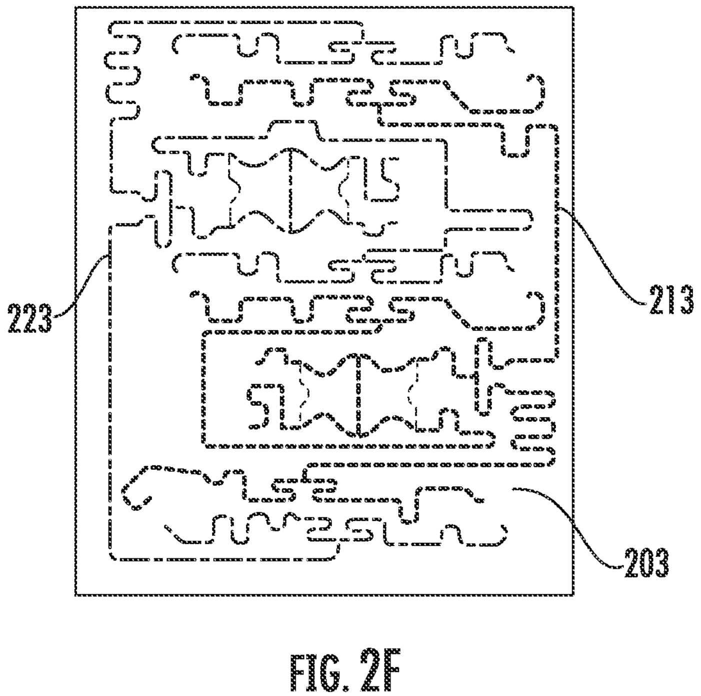
FIG. 2F is a front view of the feed board of FIG. 2E with the radiating elements omitted from view.

FIG. 2F is a front view of the feed board 203 that is shown in FIG. 2E with the six radiating elements 102 (FIG. 2E) omitted from view. As with the integrated beamforming network that is shown in FIG. 2D, the integrated beamforming network of the feed board 203 shown in FIG. 2F includes RF transmission paths 213, 223 that are on the feed board 203.

Figure 3A:
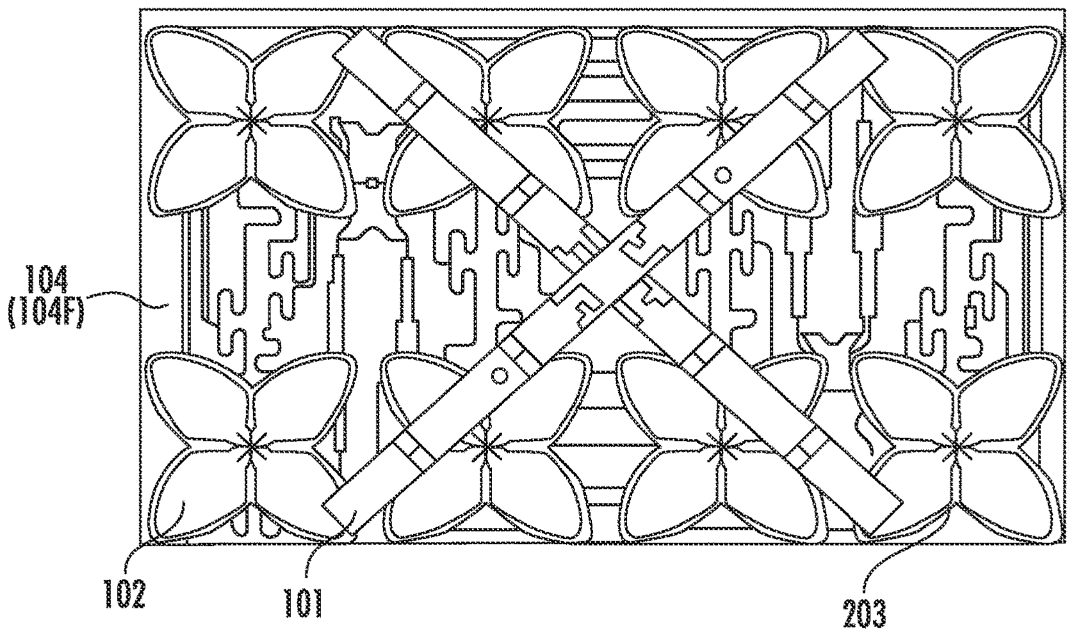
FIG. 3A is a schematic front view of a feed board having both high-band radiating elements and a low-band radiating element thereon, as well as having an integrated beamforming network, according to further embodiments of the present invention.

FIG. 3A is a schematic front view of a feed board 203 having both high-band radiating elements 102 and a low-band radiating element 101 thereon, as well as having an integrated beamforming network, according to further embodiments of the present invention. Accordingly, rather than being on a feed board 206 that is different from the feed board 203, the radiating element 101 may share the feed board 203 with the radiating elements 102. Moreover, the radiating elements 102 that are shown in FIG. 3A may provide, for example, the second group 205-2 that is illustrated in FIG. 2A.

Figure 3B:
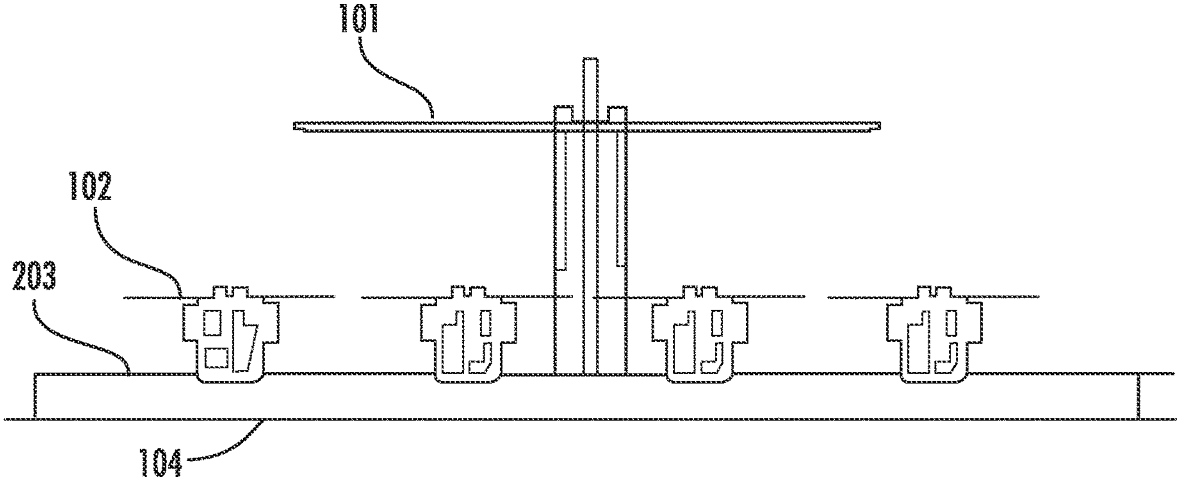
FIG. 3B is a schematic profile view of the radiating elements of FIG. 3A.

FIG. 3B is a schematic profile view of the radiating elements 101, 102 that are shown in FIG. 3A. In some embodiments, the radiating element 101 may extend forward from a center point of the feed board 203. A front surface 104F (FIG. 2A) of a reflector 104 (FIG. 2A) may have a plurality of feed boards 203 thereon, and each of the feed boards 203 may, in some embodiments, have a respective radiating element 101 thereon as well as a respective plurality of radiating elements 102.

Figure 3C:
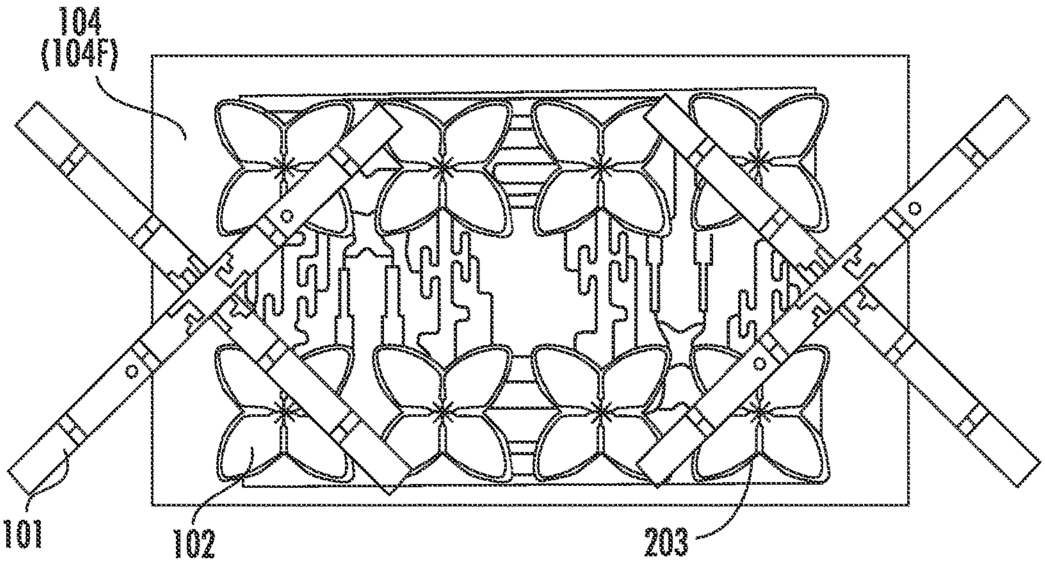
FIG. 3C is a schematic front view of a feed board having both low-band radiating elements and high-band radiating elements thereon, as well as having an integrated beamforming network, according to still further embodiments of the present invention.

FIG. 3C is a schematic front view of a feed board 203 having both low-band radiating elements 101 and high-band radiating elements 102 thereon, as well as having an integrated beamforming network, according to still further embodiments of the present invention. This arrangement differs from that shown in FIG. 3A because multiple radiating elements 101 share the feed board 203 of FIG. 3C.

Figure 3D:
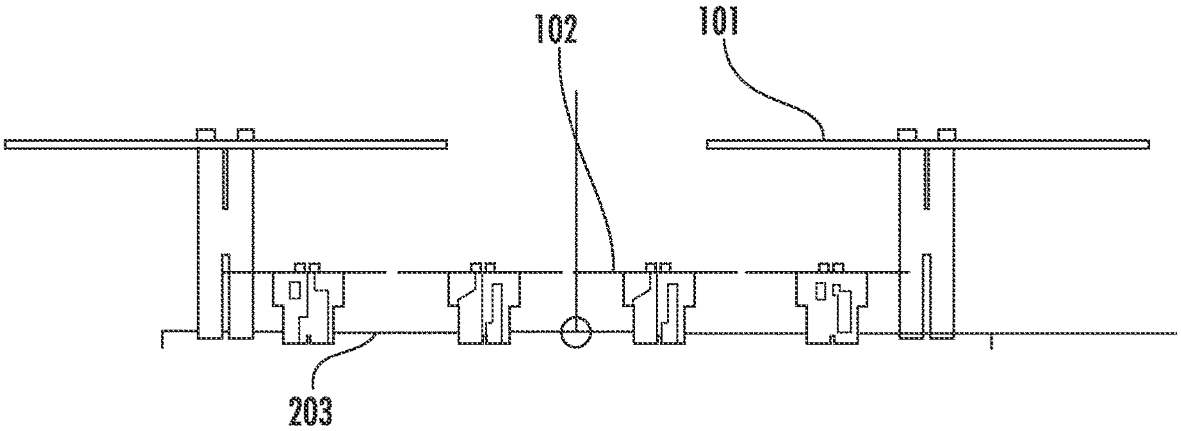
FIG. 3D is a schematic profile view of the radiating elements of FIG. 3C.

FIG. 3D is a schematic profile view of the radiating elements 101, 102 of FIG. 3C. As shown in FIG. 3D, a pair of radiating elements 101 may be on opposite ends/edges of the feed board 203. Moreover, a front surface 104F (FIG. 2A) of a reflector 104 (FIG. 2A) may have a plurality of feed boards 203 thereon, and each of the feed boards 203 may, in some embodiments, have a respective pair of radiating elements 101 thereon as well as a respective plurality of radiating elements 102.

Figure 4A:
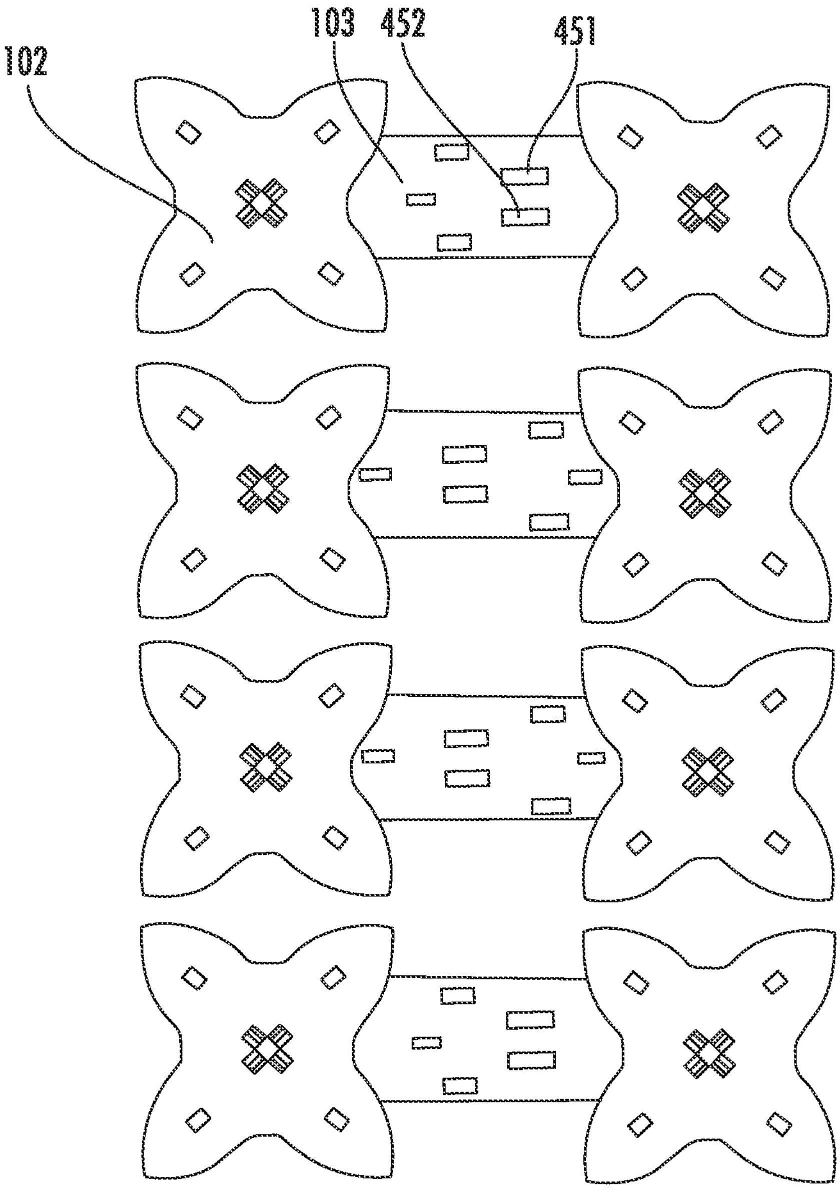
FIG. 4A is a schematic front view of feed boards having pairs of high-band radiating elements thereon according to yet further embodiments of the present invention.

FIG. 4A is a schematic front view of feed boards 103 having pairs of high-band radiating elements 102 thereon according to yet further embodiments of the present invention. The radiating elements 102 and the feed boards 103 may be on a front surface 104F (FIG. 2A) of a reflector 104 (FIG. 2A). Moreover, the feed boards 103 may include connection regions 451, 452, which may be coupled to a beamforming network.

Figure 4B:
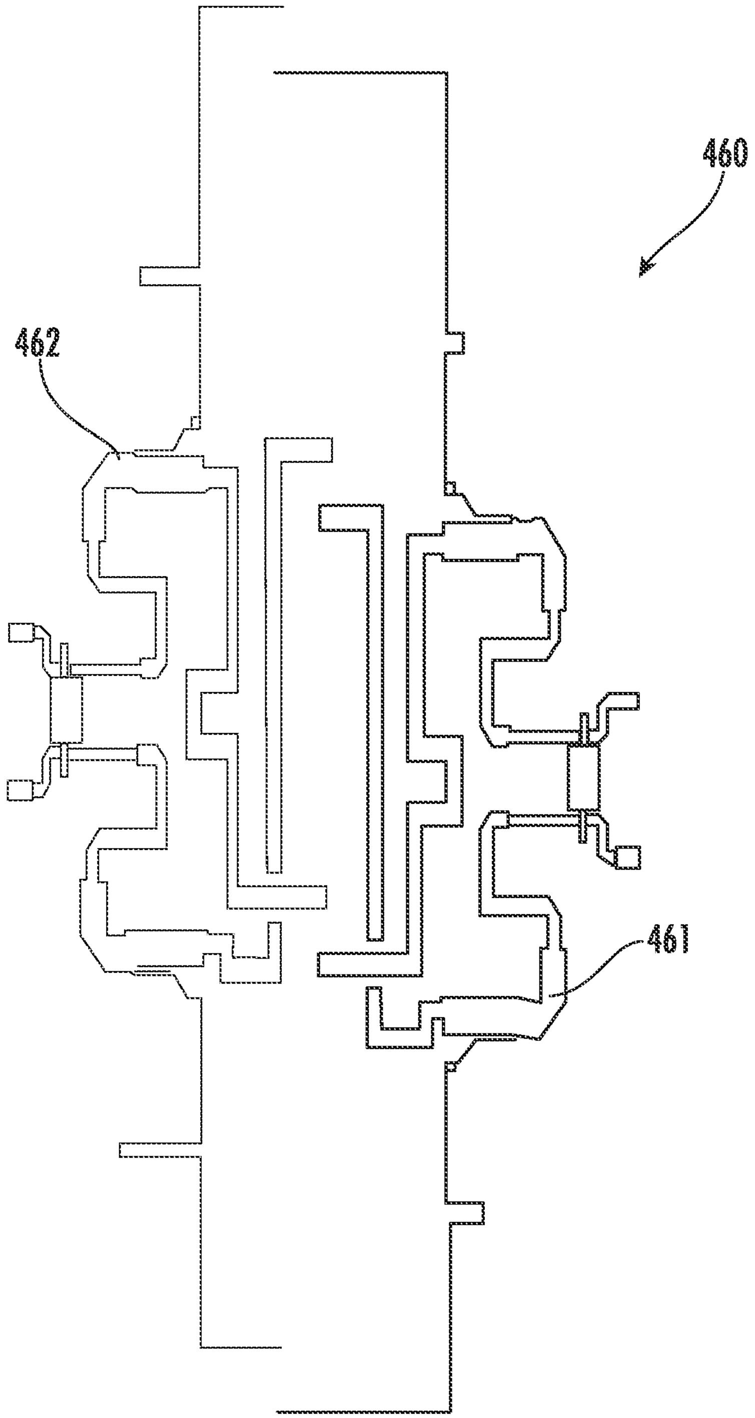
FIG. 4B is a schematic rear view of a portion of a reflector having a feed board thereon that has an integrated beamforming network that is coupled to the feed boards of FIG. 4A.

FIG. 4B is a schematic rear view of a portion of the reflector 104 (FIG. 2B) having a feed board 460 thereon that has an integrated beamforming network that is coupled to the feed boards 103 that are shown in FIG. 4A. In particular, the feed board 460 is on a back surface 104B (FIG. 2B) of the reflector 104. Unlike a beamforming network 150 (FIG. 1B) of a conventional antenna 100, however, the feed board 460 having the integrated beamforming network thereon may be free of any metal plate 159 (FIG. 1D), stud/rivet 161 (FIG. 1E), cable, and/or cable clip thereon.

The integrated beamforming network may comprise RF transmission paths 461, 462. For example, the feed board 460 may comprise a PCB, and the RF transmission paths 461, 462 may comprise traces on the PCB. Moreover, the RF transmission paths 461, 462 may be coupled between RF ports 140 (FIG. 2A) and an array/sub-array that is provided by the radiating elements 102 shown in FIG. 4A. In some embodiments, the PCB may be a small, multilayer PCB, which can help to save space.

Figure 4C:
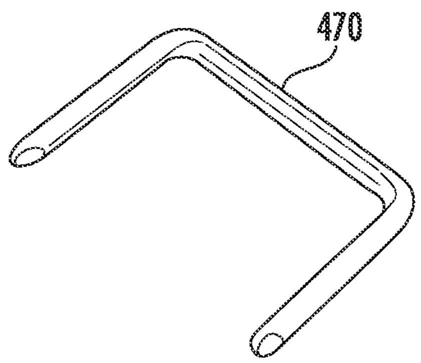
FIG. 4C is a side perspective view of a shorting connector that couples the integrated beamforming network of FIG. 4B to one of the feed boards of FIG. 4A.

FIG. 4C is a side perspective view of a shorting connector 470 that couples the integrated beamforming network that is shown in FIG. 4B to one of the feed boards 103 shown in FIG. 4A. The shorting connector 470 comprises a conductive material that is electrically connected between the integrated beamforming network and one or more of the connection regions 451, 452 (FIG. 4A) of the feed board 103. Though depicted as a U-shaped conductor in FIG. 4C, the shorting connector 470 may be another shape, such as an L shape, an I shape, a T-shape, or a straight-line shape. In particular, the shorting connector 470 may be any shorting link/pin that directly (i.e., physically) contacts both the feed board 460 (FIG. 4B) and the feed board 103 (FIG. 4A). For example, each connection region 451 may directly contact a respective shorting connector 470, and each connection region 452 may directly contact a respective shorting connector 470.

In some embodiments, a plurality of feed boards 460 may be on a back surface 104B (FIG. 2B) of a reflector 104 (FIG. 2B) and may be coupled to respective groups 205 (FIG. 2A) that are on a front surface 104F (FIG. 2A) of the reflector 104, without having any cables coupled between the groups 205 and the feed boards 460. Rather, the groups 205 and the feed boards 460 may be coupled to each other through a plurality of shorting connectors 470.

Base station antennas 200 (FIG. 2A) having integrated beamforming networks according to embodiments of the present invention may provide a number of advantages. These advantages include using fewer (e.g., eliminating) phase cables and thereby improving gain by reducing cable and transition losses. In some embodiments, the advantages may include improving passive intermodulation ("PIM") distortion by reducing the number of soldering joints and transitions. Moreover, an antenna 200 may provide a lower-cost solution by using fewer metal plates 159 (FIG. 1D), plastic clips, phase cables, and/or studs/rivets 161 (FIG. 1E). Using fewer of such components may also advantageously reduce assembly time and the weight of the antenna 200.

It will be appreciated that the present specification only describes a few example embodiments of the present invention and that the techniques described herein have applicability beyond the example embodiments described above.

The description above primarily describes the transmit paths through the base station antennas described herein. It will be appreciated that base station antennas include bi-directional RF signal paths, and that the base station antennas will also be used to receive RF signals. In the receive path, RF signals will typically be combined, whereas the RF signals are split in the transmit path. Thus, it will be apparent to the skilled artisan that the base station antennas described herein may be used to receive RF signals.

Embodiments of the present invention have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "on" another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

The invention claimed is:

1. A twin-beam base station antenna comprising:

a reflector having a first surface and a second surface that is opposite the first surface;

first and second feed boards comprising first and second integrated beamforming networks, respectively, on the first surface of the reflector;

a first plurality of high-band radiating elements that extend forward from the first feed board;

a second plurality of high-band radiating elements that extend forward from the second feed board; and a plurality of low-band radiating elements on the first surface of the reflector.

2. The twin-beam base station antenna of claim 1, wherein the second surface of the reflector is free of any beamforming network thereon.

3. The twin-beam base station antenna of claim 1, wherein the first feed board and the first plurality of high-band radiating elements are free of any cables coupled therebetween, and wherein the second feed board and the second plurality of high-band radiating elements are free of any cables coupled therebetween.

4. The twin-beam base station antenna of claim 1, wherein the first and second integrated beamforming networks comprise first and second integrated Butler Matrixes, respectively.

5. A base station antenna comprising:

a reflector having a first surface and a second surface that is opposite the first surface;

first and second feed boards comprising first and second integrated beamforming networks, respectively, on the first surface of the reflector;

a first plurality of high-band radiating elements that extend forward from the first feed board;

a second plurality of high-band radiating elements that extend forward from the second feed board;

a first low-band radiating element on the first feed board; and a second low-band radiating element on the second feed board.

6. The base station antenna of claim 5, further comprising:

a third low-band radiating element on the first feed board; and a fourth low-band radiating element on the second feed board.

7. A base station antenna comprising:

a reflector having a first surface and a second surface that is opposite the first surface;

a first group comprising a first plurality of high-band radiating elements on the first surface of the reflector;

a second group comprising a second plurality of high-band radiating elements on the first surface of the reflector;

a plurality of low-band radiating elements on the first surface of the reflector; and first and second feed boards comprising first and second integrated beamforming networks, respectively, that are coupled to the first and second groups, respectively, without any cables therebetween.

8. The base station antenna of claim 7, wherein the first and second feed boards are on the first surface of the reflector, and wherein the first and second pluralities of high-band radiating elements extend forward from the first and second feed boards, respectively.

9. The base station antenna of claim 8, further comprising:

third through tenth feed boards comprising third through tenth integrated beamforming networks, respectively, on the first surface of the reflector; and third through tenth groups of high-band radiating elements on the third through tenth feed boards, respectively, wherein the third through tenth groups are coupled to the third through tenth integrated beamforming networks, respectively, and wherein each of the first through tenth groups comprises rows of three or four radiating elements.

10. The base station antenna of claim 7, wherein the first and second feed boards are on the second surface of the reflector.

11. The base station antenna of claim 10, further comprising first and second shorting connectors that couple the first and second feed boards to the first and second groups, respectively.

12. The base station antenna of claim 7, wherein each of the first and second feed boards comprises a connection region thereon configured to receive a shorting connector for coupling a given one of the first and second feed boards to a corresponding one of the first and second groups, respectively.

13. The base station antenna of claim 8, wherein each of the first and second beamforming networks is free of any metal plate thereon.

* * * * *